United States Patent
Jiang (10) Patent No.: US 12,219,897 B2
(45) Date of Patent: Feb. 11, 2025

(54) ALL-WHEEL DRIVE SELF-PROPELLED ASSEMBLY AND MOWER

(71) Applicant: Globe (Jiangsu) Co., Ltd., Changzhou (CN)

(72) Inventor: Feng Jiang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 900 days.

(21) Appl. No.: 17/355,209

(22) Filed: Jun. 23, 2021

(65) Prior Publication Data

US 2022/0000021 A1    Jan. 6, 2022

(30) Foreign Application Priority Data

Jul. 2, 2020    (CN) .......................... 202021261751.6

(51) Int. Cl.
*A01D 34/69* (2006.01)
*A01D 34/74* (2006.01)
*A01D 101/00* (2006.01)

(52) U.S. Cl.
CPC ............. *A01D 34/74* (2013.01); *A01D 34/69* (2013.01); *A01D 2101/00* (2013.01)

(58) Field of Classification Search
CPC ........ A01D 34/69; A01D 34/74; A01D 69/06; A01D 34/00

See application file for complete search history.

(56) References Cited

U.S. PATENT DOCUMENTS

| | | | | |
|---|---|---|---|---|
| 3,677,574 A | * | 7/1972 | Cyr ........................ | A01D 34/74 280/43.13 |
| 4,785,612 A | * | 11/1988 | Morishita .............. | A01D 34/69 56/11.8 |
| 4,835,952 A | * | 6/1989 | McLane ................. | A01D 34/74 280/43.13 |
| 2016/0201771 A1 | * | 7/2016 | Wadzinski ................ | F16H 7/02 474/86 |
| 2019/0150360 A1 | * | 5/2019 | Aposhian ............... | A01D 34/66 |

FOREIGN PATENT DOCUMENTS

| | | | | | |
|---|---|---|---|---|---|
| CA | 2735595 | A1 | * | 9/2011 | ............. A01D 34/74 |
| DE | 102013223822 | A1 | * | 5/2015 | |
| EP | 1413498 | A2 | * | 4/2004 | ............. A01D 34/63 |
| EP | 1749432 | A1 | * | 2/2007 | ............. A01D 34/74 |

* cited by examiner

*Primary Examiner* — Adam J Behrens (57) ABSTRACT

Disclosed are an all-wheel drive self-propelled assembly and mower, which includes a front-drive unit including a front transmission mechanism, a front-wheel shaft mechanism and front-wheels. The front-wheel shaft mechanism includes a front linkage rod provided with a front avoidance groove matched with the front transmission mechanism. A rear-drive unit including a rear transmission mechanism provided with a rear output shaft, a rear-wheel shaft mechanism and rear-wheels, and a height adjusting unit directly or indirectly controlling the rotation of the front shaft plates. When a distance between the front output shaft and ground is minimum, the front avoidance groove is arranged above a plane where the front output shaft and the rear output shaft are located.

17 Claims, 9 Drawing Sheets

ALL-WHEEL DRIVE SELF-PROPELLED ASSEMBLY AND MOWER

CROSS REFERENCE TO RELATED APPLICATION

The present application is based on, and claims the priority from, Chinese application number CN202021261751.6, filed on Jul. 2, 2020, the disclosure of which is hereby incorporated by reference herein in its entirety.

TECHNICAL FIELD

The disclosure relates to an all-wheel drive self-propelled assembly and a mower having the all-wheel drive self-propelled assembly.

BACKGROUND

A mower is a tool for cutting weeds in a lawn, garden, pasture, and the like. In order to facilitate the garden workers to adjust the height of the mower freely, the mower is usually provided with a height adjusting mechanism to adjust the mowing height by adjusting the height above the ground of the output shaft. The height adjustment mechanism adjusts the height above the ground of the output shaft by a wheel shaft rod that pivotally connects the rear-wheels. The wheel shaft rod is provided with an avoidance groove that cooperates with the rear-wheel drive mechanism. Since the rear portion of the mower is usually provided with a grass discharging cavity, a movement trail of the avoidance groove is located at the bottom of the rear-wheel drive mechanism when the wheel shaft rod is rotated to adjust the mowing height.

In addition, to make the mower cut the grass neatly, the housing of the mower is typically set low at the front and high at the back. This arrangement can avoid the avoidance groove to scraping the ground when the mowing height of the mower is set to the minimum. Therefore, when both the front-wheels and the rear-wheels of the mower are provided with the drive mechanism, if the existing height adjusting mechanism is arranged on the front-wheels, the avoidance groove of the wheel shaft rod arranged on the front-wheels will scrap the ground, so that the mower cannot move.

BRIEF DESCRIPTION OF THE DISCLOSURE

The disclosure provides an all-wheel drive self-propelled assembly. The all-wheel drive self-propelled assembly can adjust the mowing height freely on the premise of maintaining the lowest mowing height of an existing mower so that the defect that an existing height adjusting mechanism scrapes the ground is avoided.

The present disclosure provides an all-wheel drive self-propelled assembly which includes: a front-drive unit including a front transmission mechanism, a front-wheel shaft mechanism and front-wheels; the front-wheel shaft mechanism including a pair of front shaft plates and a front linkage rod that connects the pair of front shaft plates; the front transmission mechanism and the front-wheels mounted on the front shaft plate; a rear-drive unit, including a rear transmission mechanism, a rear-wheel shaft mechanism and rear-wheels; the rear-wheel shaft mechanism including a pair of rear shaft plates and a rear linkage rod that connects the pair of rear shaft plates; the rear transmission mechanism and the rear-wheels mounted on the rear shaft plate; and a height adjusting unit directly or indirectly controlling the front shaft plate and the rear shaft plate to rotate to adjust the distance from the front transmission mechanism and the rear transmission mechanism to the ground, the front linkage rod rotably disposed above the plane where axes of the front transmission mechanism and the rear transmission mechanism are located.

As a further improvement of the present disclosure, the front linkage rod is provided with a front avoidance groove that cooperates with the front transmission mechanism, the front transmission mechanism is provided with a front output shaft, the front shaft plate is pivotally mounted on the front output shaft; the rear transmission mechanism is provided with a rear output shaft, and the rear shaft plate is pivotally mounted on the rear output shaft; when the distance between the front output shaft and the ground is minimum, the front avoidance groove is disposed above a plane where the front output shaft and the rear output shaft are located.

As a further improvement of the disclosure, the front linkage rod is arranged that when the front linkage rod rotates, a movement trail of the front avoidance groove is located above a plane where the front output shaft and the rear output shaft are located.

As a further improvement of the present disclosure, the front linkage rod is arranged that when the distance between the front output shaft and the ground is maxima, the front avoidance groove is located below a plane where the front output shaft and the rear output shaft are located.

As a further improvement of the disclosure, the rear linkage rod is arranged that when the rear linkage rod rotates, a movement trail of the rear avoidance groove is located below a plane where the front output shaft and the rear output shaft are located.

As a further improvement of the present disclosure, the height adjusting unit includes a transmission rod and a height adjusting handle; one end of the transmission rod is pivotally mounted on the front shaft plate, and the other end of the transmission rod is pivotally mounted on the rear shaft plate; the height adjusting handle is mounted on the front shaft plate or the rear shaft plate, and can drive the front shaft plate or the rear shaft plate to rotate around the front output shaft or the rear output shaft.

As a further improvement of the present disclosure, the height adjusting handle and the transmission rod are located on different sides of the front output shaft or the rear output shaft.

As a further improvement of the present disclosure, the height adjusting unit further comprises a height-adjusting baffle that cooperates with the height adjusting handle, the height-adjusting baffle is provided with a plurality of gear slots; the height adjusting handle is pivotally mounted on the front shaft plate or the rear shaft plate and can rotate around the front shaft plate or the rear shaft plate, after pushed along the axial direction of the front output shaft or the rear output shaft to be rotated, the height adjusting handle is disengaged from the gear slots, and the height adjusting handle can be pushed to rotate around the front output shaft or the rear output shaft, thereby driving the front-wheels or the rear-wheels to rotate around the front output shaft or the rear output shaft to adjust the distance between the front output shaft or the rear output shaft and the ground.

As a further improvement of the present disclosure, the height adjusting unit further includes a handle reset elastic element that cooperates with the height adjusting handle; after pushed along the axial direction of the front output shaft or the rear output shaft to be rotated, the height adjusting handle is disengaged from the gear slots, an elastic deformation of the handle reset elastic element occurs; and when the height adjusting handle is released, the height adjustment handle enters the gear slots under the action of the handle reset elastic element.

As a further improvement of the present disclosure, when the front shaft plate and the rear shaft plate are rotated by the height adjusting unit, the front shaft plate and the rear shaft plate are arranged to rotate along a same direction.

As a further improvement of the present disclosure, the front-drive unit further includes a front-drive gear set; and the front-drive gear set includes: a front-drive gear that is fixedly mounted on the front output shaft, and a front-driven gear that is fixedly mounted on the front-wheel and engaged with the front-drive gear; the rear-drive unit further includes a rear-drive gear set; and the rear-drive gear set includes: a rear-drive gear that is fixedly mounted on the rear output shaft, and a rear-driven gear that is fixedly mounted on the rear-wheel and engaged with the rear-drive gear.

In another aspect, the disclosure provides a mower which includes an all-wheel drive self-propelled assembly, a housing disposed on the all-wheel drive self-propelled assembly, and a cutting assembly disposed on the housing. The all-wheel drive self-propelled assembly includes a front-drive unit, a rear-drive unit and a height adjusting unit. The front-drive unit includes a front transmission mechanism, a front-wheel shaft mechanism and front-wheels; and the front-wheel shaft mechanism includes a pair of front shaft plates and a front linkage rod that connects the pair of front shaft plates; the front transmission mechanism and the front-wheels are mounted on the front shaft plate. The rear-drive unit includes a rear transmission mechanism, a rear-wheel shaft mechanism, and rear-wheels; and the rear-wheel shaft mechanism includes a pair of rear shaft plates and a rear linkage rod that connects the pair of rear shaft plates; the rear transmission mechanism and the rear-wheels are mounted on the rear shaft plate. The height adjusting unit, directly or indirectly controls the front shaft plate and the rear shaft plate to rotate to adjust the distance from the front transmission mechanism and the rear transmission mechanism to the ground. The front linkage rod is rotably disposed above a plane where axes of the front transmission mechanism and the rear transmission mechanism are located.

As a further improvement of the present disclosure, the front linkage rod is provided with a front avoidance groove that cooperates with the front transmission mechanism, the front transmission mechanism is provided with a front output shaft, the front shaft plate is pivotally mounted on the front output shaft; the rear transmission mechanism is provided with a rear output shaft, and the rear shaft plate is pivotally mounted on the rear output shaft; when the distance between the front output shaft and the ground is minimum, the front avoidance groove is disposed above a plane where the front output shaft and the rear output shaft are located.

As a further improvement of the present disclosure, the front linkage rod is arranged that when the front linkage rod rotates, a movement trail of the front avoidance groove is located above a plane where the front output shaft and the rear output shaft are located.

As a further improvement of the present disclosure, the height adjusting unit includes a transmission rod and a height adjusting handle; one end of the transmission rod is pivotally mounted on the front shaft plate, and the other end of the transmission rod is pivotally mounted on the rear shaft plate; the height adjusting handle is mounted on the front shaft plate or the rear shaft plate, and can drive the front shaft plate or the rear shaft plate to rotate around the front output shaft or the rear output shaft.

As a further improvement of the present disclosure, the height adjusting unit further includes a height-adjusting baffle that cooperates with the height adjusting handle, the height-adjusting baffle is provided with a plurality of gear slots; the height adjusting handle is pivotally mounted on the front shaft plate or the rear shaft plate and can rotate around the front shaft plate or the rear shaft plate, when pushed along the axial direction of the front output shaft or the rear output shaft to be rotated, the height adjusting handle is disengaged from the gear slots, and the height adjustment handle can be pushed to rotate around the front output shaft or the rear output shaft, thereby driving the front-wheels or the rear-wheels to rotate around the front output shaft or the rear output shaft to adjust the distance between the front output shaft or the rear output shaft and the ground.

As a further improvement of the present disclosure, the height adjusting unit further includes a handle reset elastic element that cooperates with the height adjusting handle; after pushed along the axial direction of the front output shaft or the rear output shaft to be rotated, the height adjusting handle is disengaged from the gear slots, an elastic deformation of the handle reset elastic element occurs; and when the height adjusting handle is released, the height adjustment handle enters the gear slots under the action of the handle reset elastic element.

As a further improvement of the disclosure, the height adjusting unit further includes a gear reset elastic element; one end of the gear reset elastic element is fixedly mounted on the transmission rod, and the other end of the gear reset elastic element is fixedly mounted on the housing; and when the distance between the front output shaft and the ground is adjusted from small to large by the height adjusting unit, an elastic deformation of the gear reset elastic element occurs.

As a further improvement of the present disclosure, the front-drive unit further includes a front-drive gear set; and the front-drive gear set includes: a front-drive that is gear fixedly mounted on the front output shaft, and a front-driven gear that is fixedly mounted on one of the front-wheels and engaged with the front-drive gear; and the rear-drive unit further comprises a rear-drive gear set; and the rear-drive gear set includes: a rear-drive gear that is fixedly mounted on the rear output shaft, and a rear-driven gear that is fixedly mounted on one of the rear-wheels and engaged with the rear-drive gear.

As a further improvement of the present disclosure, both the front transmission mechanism and the rear transmission mechanism include a gearbox and a motor that outputs power to the gearbox.

As a further improvement of the present disclosure, when the front shaft plate and the rear shaft plate are rotated by the height adjusting unit, the front shaft plate and the rear shaft plate are arranged to rotate along different directions.

The all-wheel drive self-propelled assembly and mower have the beneficial effects that: the all-wheel drive self-propelled assembly can adjust the mowing height freely on the premise of maintaining the lowest mowing height of an existing mower so that the defect that an existing height adjusting mechanism scrapes the ground is avoided.

DETAILED DESCRIPTION

In order to make the objectives, technical solutions, and advantages of the disclosure clearer, the drawings combined with embodiments will be described below in detail.

Figure 1:
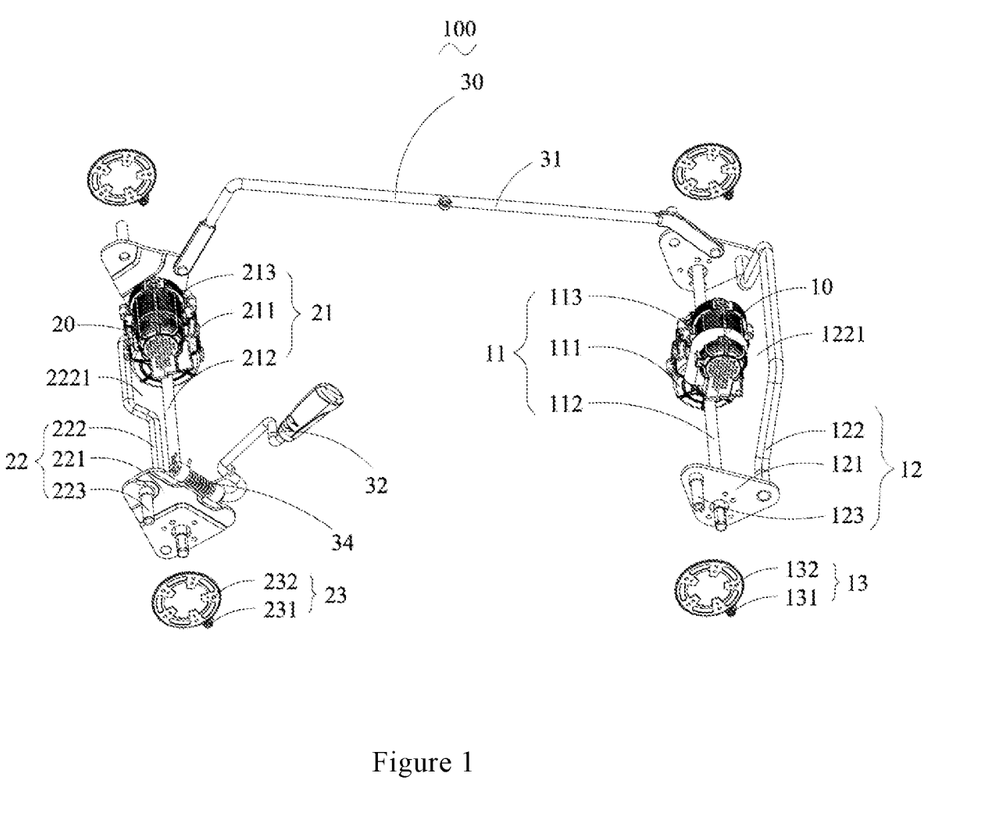
FIG. 1 is a schematic perspective view of an all-wheel drive self-propelled assembly according to an embodiment of the disclosure.

Referring to FIG. 1, the disclosure provides an all-wheel drive self-propelled assembly 100 for a mower, a lawn mower, and the like. The all-wheel drive self-propelled assembly 100 includes a front-drive unit 10, a rear-drive unit 20, and a height adjusting unit 30.

Figure 2:
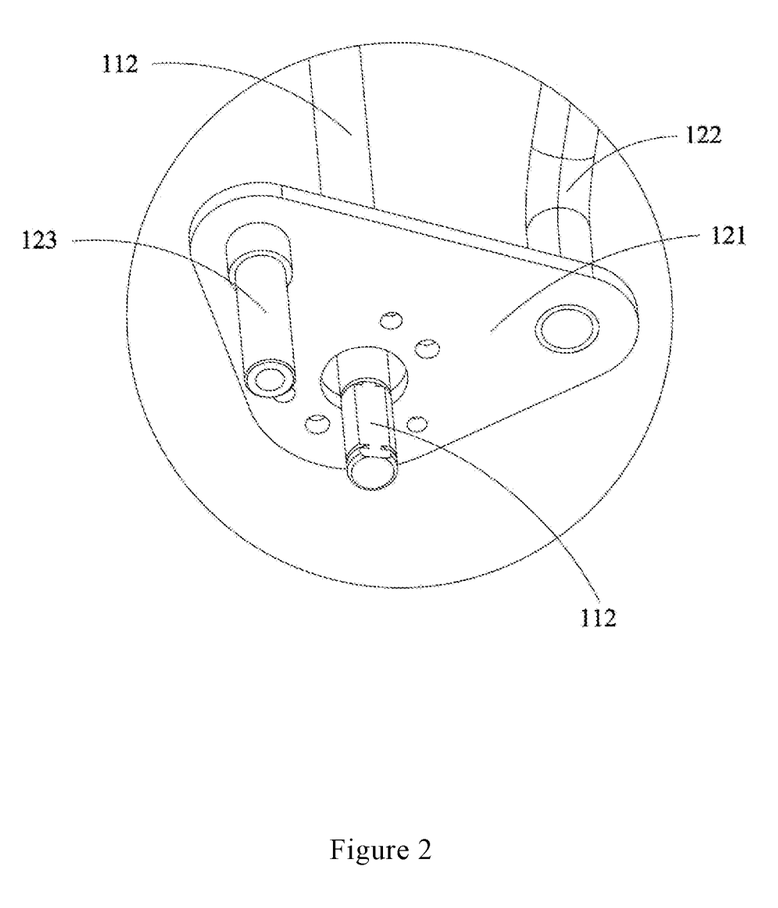
FIG. 2 is a schematic partial enlarged view of a front-drive unit according to an embodiment of the disclosure.
Figure 5:
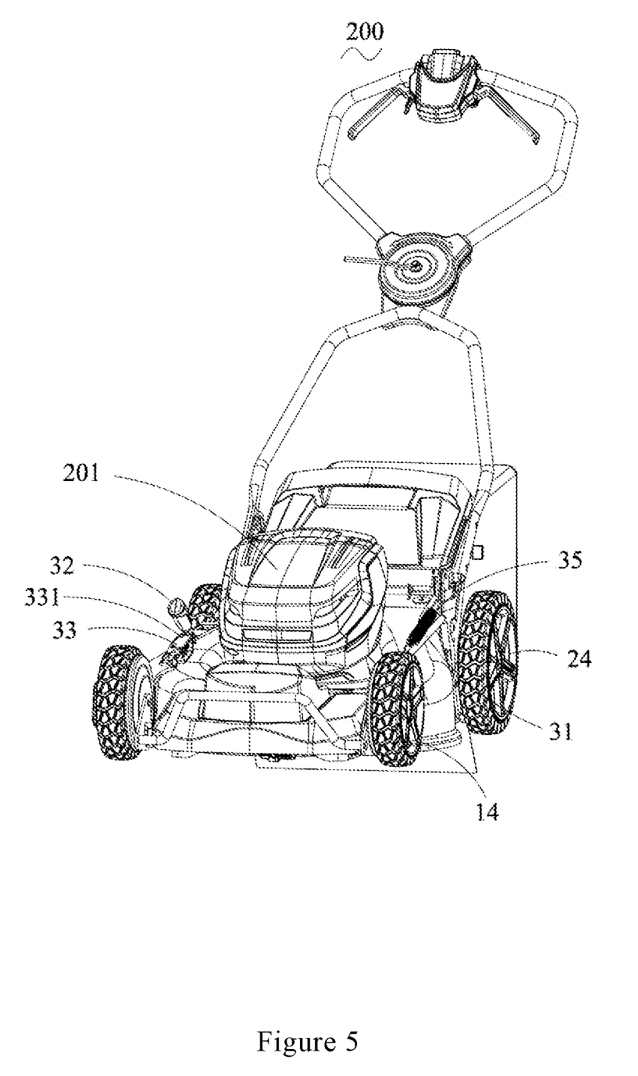
FIG. 5 is a schematic perspective view of a mower according to an embodiment of the disclosure.

Referring to FIG. 1 and FIG. 2, the front-drive unit 10 includes a front transmission mechanism 11, a front-wheel shaft mechanism 12, a front gear set 13, and front-wheels 14 (as shown in FIG. 5). The front transmission mechanism 11 includes a front gearbox 111, a front output shaft 112 that cooperates with the front gearbox 111, and a motor 113 that supply powers to the front gearbox 111. The motor 113 may be an electrical machine, a gasoline engine, and the like. The front-wheel shaft mechanism 12 includes a pair of front shaft plates 121 that are pivotally mounted on the front output shaft 112, a front linkage rod 122 that connects the pair of front shaft plates 121, and a front-wheel shaft 123 that is mounted on the front shaft plate 121 and cooperates with the front-wheels 14.

The front shaft plate 121 that is pivotally mounted on the front output shaft 112 by a bearing (not shown). In the present embodiment, the front shaft plate 121 is a roughly regular triangle. However, in other embodiments, the front shaft plate 121 may be configured in other shapes as needed. The front linkage rod 122 is provided with a front avoidance groove 1221 that cooperates with the front transmission mechanism 11 to avoid collision with the front transmission mechanism 11 when the front linkage rod 122 rotates. The front gear set 13 includes a front-drive gear 131 that is fixedly mounted on the front output shaft 112, and a front-driven gear 132 that is fixedly mounted on one of the front-wheels 14 and engaged with the front-drive gear 131, the front-wheel 14 that is pivotally mounted on the front-wheel shaft 123 and co-rotates with the front-driven gear 132. When the front-drive unit 10 is working, the front output shaft 112 drives the front-drive gear 131 to rotate, and the front-drive gear 131 drives the front-driven gear 132 to rotate so that the front-wheels 14 are rotated by the front-driven gear 132. In the present embodiment, the front-wheel shaft 123 is not coaxial with the front linkage rod 122, but in other embodiments, the front-wheel shaft 123 and the front linkage rod 122 can also be disposed of coaxially.

Figure 3:
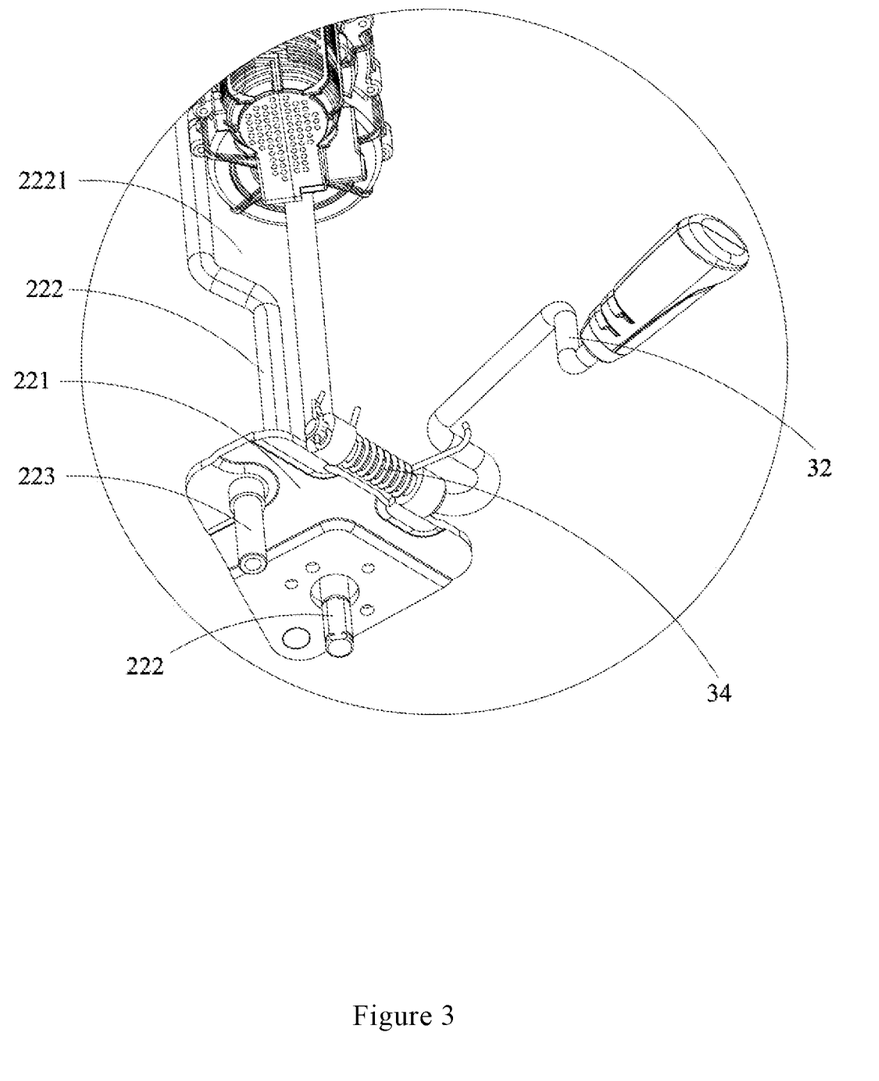
FIG. 3 is a schematic partial enlarged view of a rear-drive unit according to an embodiment of the disclosure.

Referring to FIG. 1 through FIG. 3, the rear-drive unit 20 includes a rear transmission mechanism 21, a rear-wheel shaft mechanism 22, a rear-drive gear set 23, and rear-wheels 24 (as shown in FIG. 5). The rear transmission mechanism 21 includes a rear gearbox 211, a rear output shaft 212 that cooperates with the rear gearbox 211, and a motor 213 that supplies powers to the rear gearbox. The motor 213 may be an electrical machine, a gasoline engine, and the like. The rear-wheel shaft mechanism 22 includes a pair of rear shaft plates 221 which are pivotally mounted on the rear output shaft 212, a rear linkage rod 222 that connects the pair of rear shaft plates 221, and a rear-wheel shaft 223 that is mounted on the rear shaft plate 221 and cooperates with the rear-wheels 24.

The rear shaft plate 221 that is pivotally mounted on the rear output shaft 212 by a bearing (not shown). The rear linkage rod 222 is provided with a rear avoidance groove 2221 that cooperates with the rear transmission mechanism 21 to avoid collision with the front transmission mechanism 21 when the rear linkage rod 222 rotates. The rear-drive gear set 23 includes a rear-drive gear 231 that is fixedly mounted on the rear output shaft 212, and a rear-driven gear 232 that is fixedly mounted on one of the rear-wheel 24 and engaged with the rear-drive gear 231. The rear-wheels 24 are pivotally mounted on the rear-wheel shaft 223 and co-rotate with the rear-driven gear 232. When the rear-drive unit 20 is working, the rear output shaft 212 drives the rear-drive gear 231 to rotate, and the rear-drive gear 231 drives the rear-driven gear 232 to rotate so that the rear-wheels 24 rotate under the effect of the rear-driven gear 232. In the present embodiment, the rear-wheel shaft 223 is not coaxial with the rear linkage rod 222, but in other embodiments, the rear-wheel shaft 223 and the rear linkage rod 222 can also be disposed of coaxially.

Referring to FIGS. 1, 3, and 5, the height adjusting unit 30 directly or indirectly controls the rotation of the front shaft plate 121 and the rear shaft plate 221 so that the front-wheel shaft 123 and the rear-wheel shaft 223 rotate around the front output shaft 112 and the rear output shaft 212 respectively, thereby adjusting the distance above the ground of the front output shaft 112 and the rear output shaft 212. The height adjusting unit 30 includes a transmission rod 31, a height adjusting handle 32, a height adjusting baffle 33, a handle reset elastic element 34 which cooperates with the height adjusting handle 32, and a gear reset elastic element 35 which cooperates with the transmission rod 31. One end of the transmission rod 31 is pivotally mounted on the front shaft plate 121, and the other end of the transmission rod 31 is pivotally mounted on the rear shaft plate 221 so that the front shaft plate 121 and the rear shaft plate 221 rotate synchronously.

The height adjusting handle 32 is pivotally mounted on the rear shaft plate 221 and can rotate around the rear shaft plate 221. The height adjusting baffle 33 is used to cooperate with the height adjusting handle 32, and a plurality of gear slots 331 which cooperate with the height adjusting handle 32 are disposed on the height adjusting baffle 33. In the embodiment, the number of the gear slots 331 is 7, so that the user can finely locate the rotation angle of the height adjusting handle 32. One end of the gear reset elastic element 35 is fixedly mounted on the transmission rod 31, and the other end of the gear reset elastic element 35 is mounted on the housing of the lawn-mower or the push mower. The height adjusting handle 32 is pushed along an axial of the rear output shaft 212 such that the height adjusting handle 32 is disengaged from the gear slots 331, at this point, an elastic deformation of the gear reset elastic element 34 occurs, the user can push the height adjusting handle 32 to rotate around the rear output shaft 212, thereby driving the rear shaft plate 221 and the front shaft plate 121 to rotate, thereby driving the rear-wheel shaft 223 and the front-wheel shaft 123 to rotate around the rear output shaft 212 and the front output shaft 112 respectively, to achieve the purpose of adjusting the distance above the ground of the rear output shaft 212 and the front output shaft 112.

Figure 6:
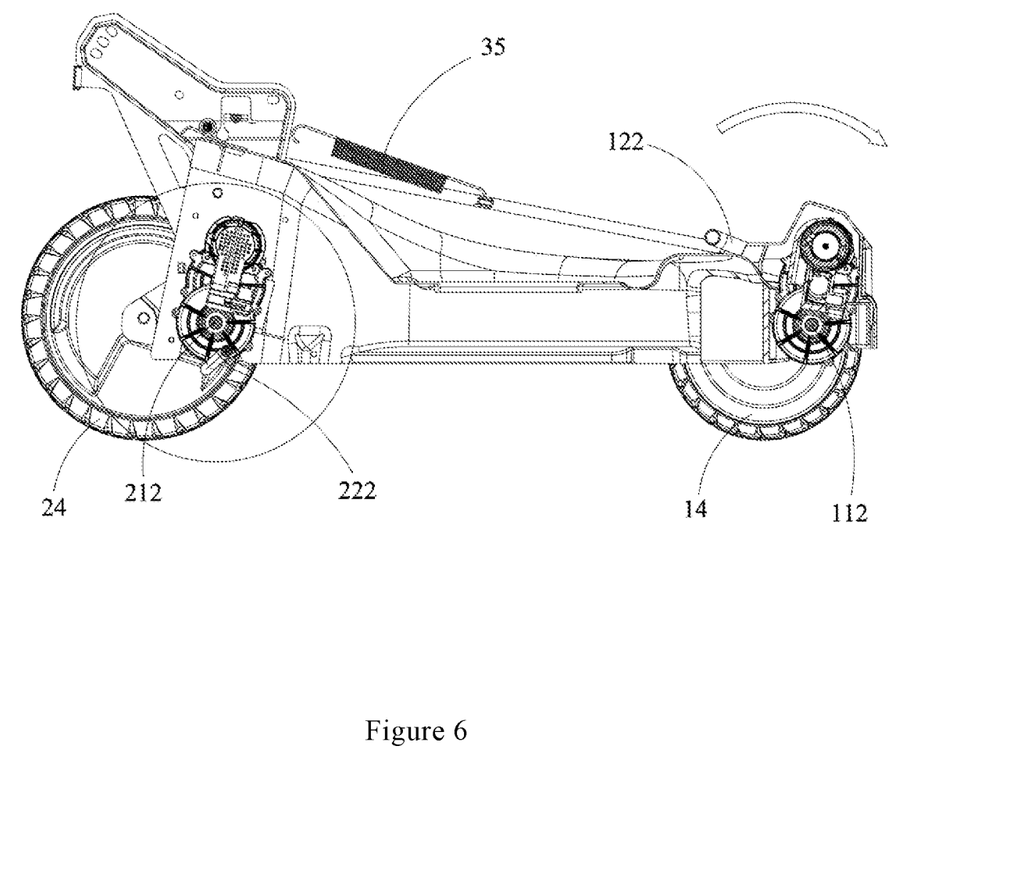
FIG. 6 is a schematic cross-sectional view of an all-wheel drive self-propelled assembly in the highest mowing height according to an embodiment of the disclosure.
Figure 7:
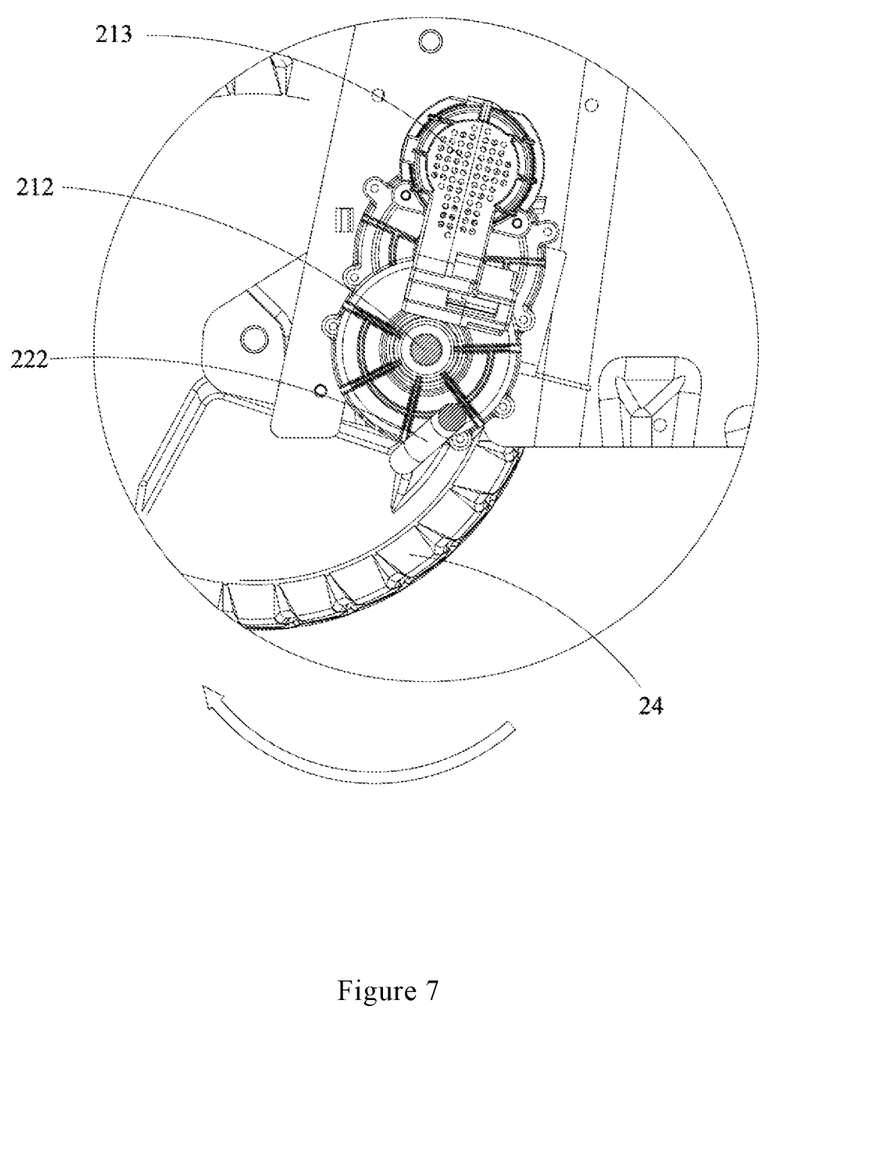
FIG. 7 is a schematic partial enlarged view of the circled portion in FIG. 6.

After the height adjustment is completed, the height adjusting handle 32 is pushed into the gear slots 331, at this point, the handle reset elastic element 34 is restored to the original state. When the distances above the ground of the rear output shaft 212 and the front output shaft 112 are adjusted from small to large, an elastic deformation of the gear reset elastic element 35 occurs under the effect of the transmission rod 31; when the distances above the ground of the rear output shaft 212 and the front output shaft 112 are adjusted from large to small in the direction of the arrow shown in FIG. 6, in another word, the state which is shown in FIG. 6 is adjusted to the state shown in FIG. 8, then the gear reset elastic element 35 is gradually restored to the original state.

In the present embodiment, the height adjusting handle 32 is mounted on the rear shaft plate 221, but in other embodiments, the height adjusting handle 32 may also be mounted on the front shaft plate 121. In the present embodiment, the height adjusting handle 32 and the transmission rod 31 are located on different sides of the front output shaft 112 and the rear output shaft 212, but in other embodiments, the height adjusting handle 32 and the transmission rod 31 can also be located on the same side of the front output shaft 112 and the rear output shaft 212. In the present embodiment, when the front shaft plate 121 and the rear shaft plate 221 are rotated by the height adjusting unit 30, the front shaft plate 121 and the rear shaft plate 221 are arranged to rotate along a same direction, but in other embodiments, the front shaft plate 121 and the rear shaft plate 221 can also be arranged to rotate along the opposite directions.

Figure 4:
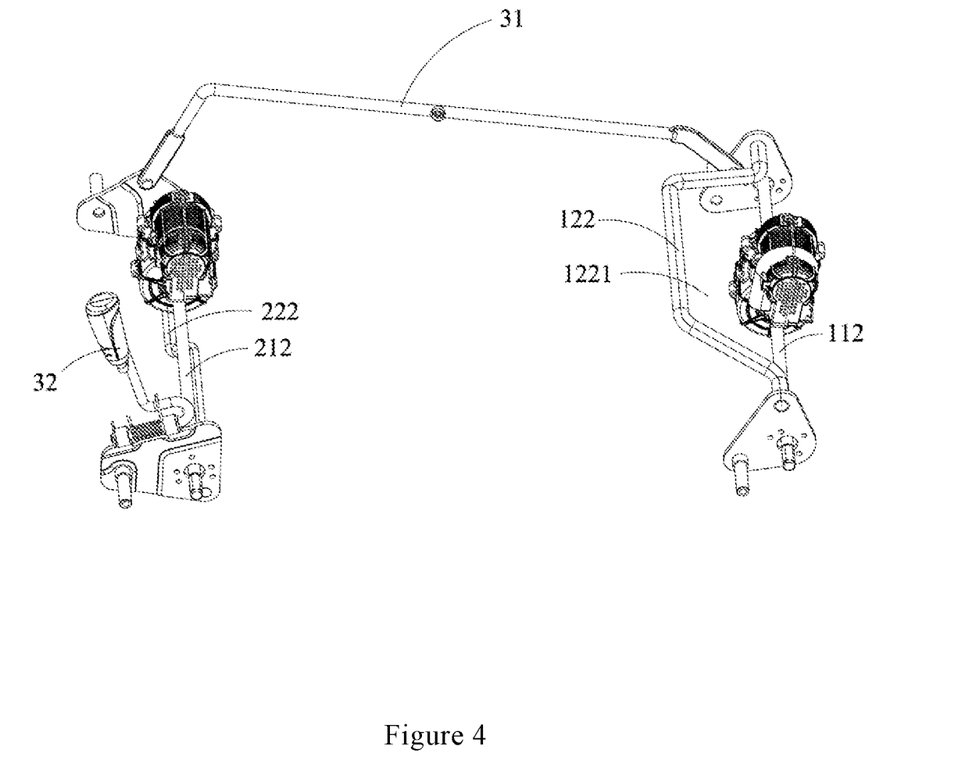
FIG. 4 is a schematic perspective view of another state of the all-wheel drive self-propelled assembly as shown in FIG. 1.
Figure 8:
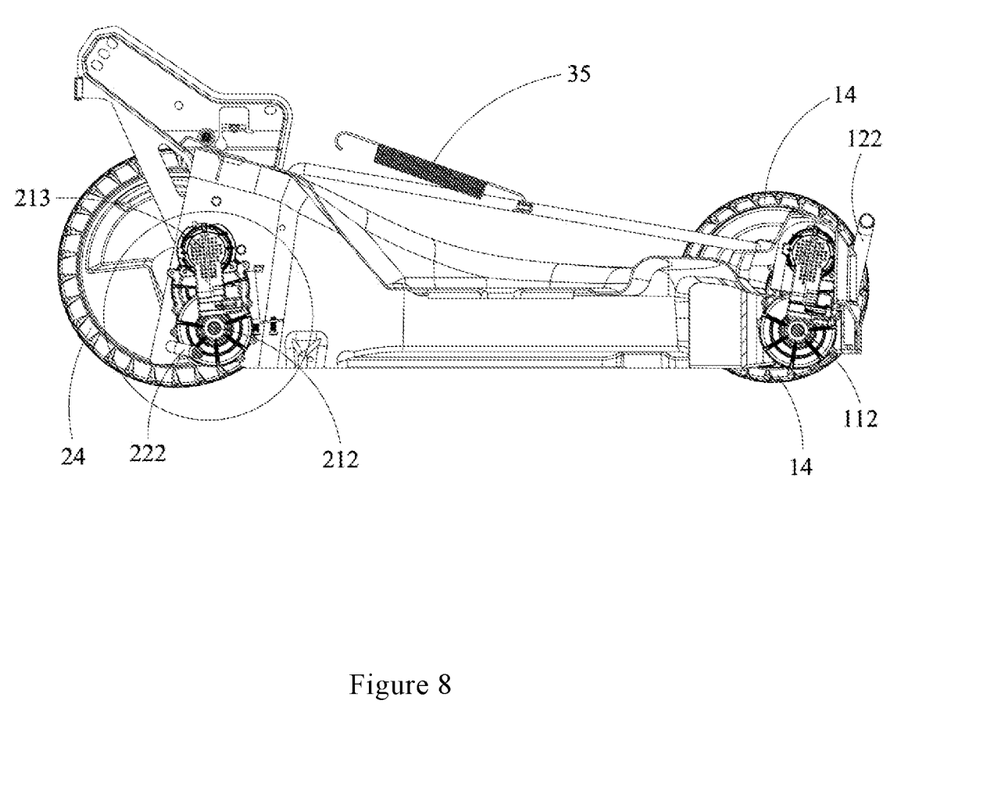
FIG. 8 is a schematic cross-sectional view of the all-wheel drive self-propelled assembly in the lowest mowing height according to an embodiment of the disclosure.
Figure 9:
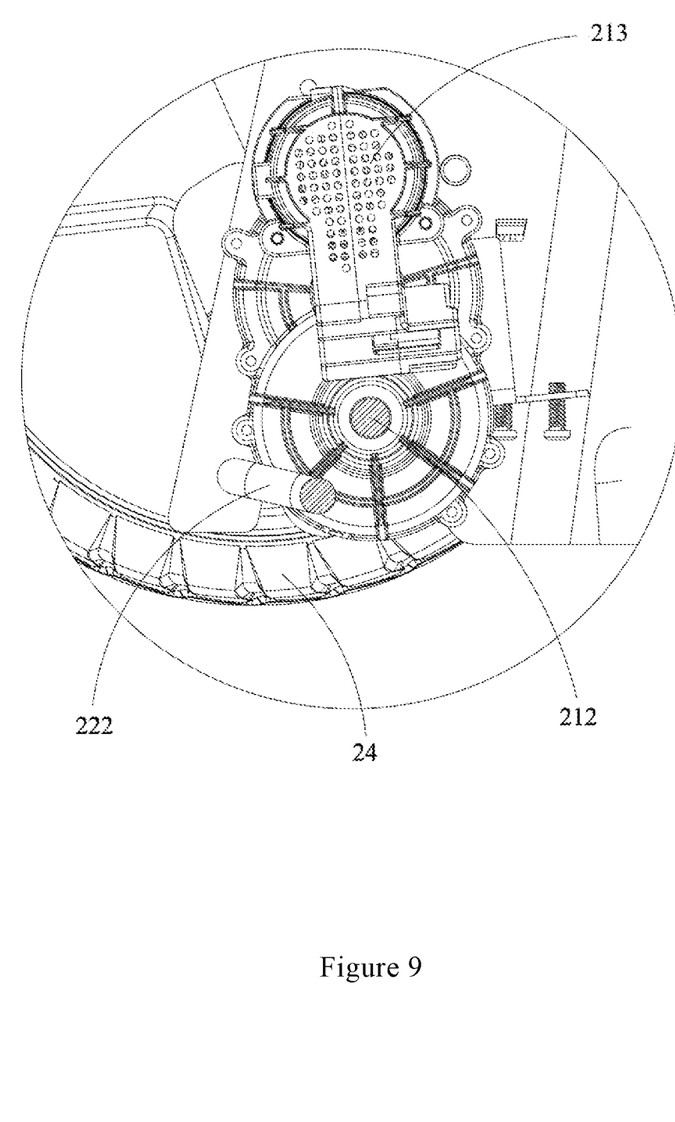
FIG. 9 is a schematic partial enlarged view of the circled portion in FIG. 8.

FIG. 1 and FIG. 8 are the schematic views of the all-wheel drive self-propelled assembly, when the distances above the ground of the front output shaft 112 and the rear output shaft 212 are minimum. FIG. 4 and FIG. 6 are the schematic views of the all-wheel drive self-propelled assembly when the distances above the ground of the front output shaft 112 and the rear output shaft 212 are maxima. As shown in FIG. 8, to prevent the front linkage rod 122 from scraping the ground, the front linkage rod 122 is arranged so that when the front linkage rod 122 rotates, a movement trail of the front avoidance groove 1221 is located above a plane where the front output shaft 112 and the rear output shaft 212 are located.

Preferably, the front linkage rod 122 may also be arranged that when the distance between the front output shaft 112 and the ground is maxima, the front avoidance groove 1221 is located below the plane where the front output shaft 112 and the rear output shaft 212 are located; when the distance between the front output shaft 112 and the ground is minimum, the front avoidance groove 1221 is disposed above the plane where the front output shaft 112 and the rear output shaft 212 are located. In this way, the front linkage rod 122 can be effectively prevented from scraping the ground during height adjustment. The rear linkage rod 222 is arranged that when the rear linkage rod rotates 222, a movement trail of the rear avoidance groove 2221 is located below the plane where the front output shaft 112 and the rear output shaft 212 are located. In this way, the rear linkage rod 222 can avoid collision with the grass discharging cavity of the mower or the lawn mower.

Compared with the prior art, the all-wheel drive self-propelled assembly 100 put a movement trail of the front avoidance groove 1221 at least partly above a plane where the front output shaft 112 and the rear output shaft 212 are located, so that the front linkage rod 122 does not scrape the ground during the height adjustment process, so that the all-wheel drive self-propelled assembly 100 can adjust the mowing height freely on the premise of maintaining the lowest mowing height of an existing mower, so that the defect that an existing height adjusting mechanism scrapes the ground is avoided.

Referring to FIG. 5, the present disclosure also discloses a mower 200 includes the all-wheel drive self-propelled assembly 100, a housing 201 which is pivotally mounted on the all-wheel drive self-propelled assembly 100, and a cutting assembly (not shown). The housing 201 is pivotally mounted on the front output shaft 112 and the rear output shaft 212 by bearings. The cutting assembly is mounted on the housing 201.

In conclusion, the all-wheel drive self-walking assembly 100 put a movement trail of the front avoidance groove 1221 at least partly above a plane where the front output shaft 112 and the rear output shaft 212 are located, so that the front linkage rod 122 does not scrape the ground during the height adjustment process, thereby the all-wheel drive self-propelled assembly 100 can adjust the mowing height freely on the premise of maintaining the lowest mowing height of an existing mower, so that the defect that an existing height adjusting mechanism scrapes the ground is avoided.

While the disclosure has been described in detail regarding preferred embodiments, those skilled in the art can easily understand other advantages and effects of the disclosure from the content disclosed in this specification. The disclosure can be implemented or applied through other different specific embodiments, and various details in the specification can be modified or changed based on different viewpoints and applications without departing from the spirit of the disclosure.

What is claimed is:

1. An all-wheel drive self-propelled assembly (100), comprising:
    a front-drive unit (10), including:
    a front transmission mechanism (11) having a front motor (113),
    a front-wheel shaft mechanism (12), having a pair of front shaft plates (121) and a front linkage rod (122) that connects the pair of front shaft plates (121) and
    front-wheels (14),
    wherein the front transmission mechanism (11) and the front-wheels (14) are mounted on the pair of front shaft plates (121);
    a rear-drive unit (20), including:
    a rear transmission mechanism (21) having a rear motor (213),
    a rear-wheel shaft mechanism (22), having a pair of rear shaft plates (221) and a rear linkage rod (222) that connects the pair of rear shaft plates (221), and
    rear-wheels (24),
    wherein the rear transmission mechanism (21) and the rear-wheels (24) are mounted on the pair of rear shaft plates (221); and
    a height adjusting unit (30), which directly or indirectly controls the pair of front shaft plates (121) and the pair of rear shaft plates (221) to rotate in order to adjust a distance from the front transmission mechanism (11) and the rear transmission mechanism (21) to a ground surface, wherein the front linkage rod (122) is rotatably disposed above a plane where axes of the front transmission mechanism (11) and the rear transmission mechanism (21) are located, wherein the front linkage rod (122) is provided with a front avoidance groove (1221) that cooperates with the front transmission mechanism (11), the front transmission mechanism (11) is provided with a front output shaft (112), and the pair of front shaft plates (121) are pivotally mounted on the front output shaft (112);

the rear transmission mechanism (21) is provided with a rear output shaft (212), and the pair of rear shaft plates (221) are pivotally mounted on the rear output shaft (212); and when the distance between the front output shaft (112) and the ground surface is minimum, the front avoidance groove (1221) is disposed above a plane where the front output shaft (112) and the rear output shaft (212) are located.

2. The all-wheel drive self-propelled assembly of claim 1, wherein the front linkage rod (122) is arranged that, when the front linkage rod (122) rotates, a movement trail of the front avoidance groove (1221) is located above the plane where the front output shaft (112) and the rear output shaft (212) are located.

3. The all-wheel drive self-propelled assembly of claim 1, wherein the height adjusting unit (30) comprises a transmission rod (31) and a height adjusting handle (32), wherein
one end of the transmission rod (31) is pivotally mounted on the pair of front shaft plates (121), and the other end of the transmission rod (31) is pivotally mounted on the pair of rear shaft plates (221), and
the height adjusting handle (32) is mounted on the pair of front shaft plates (121) or the pair of rear shaft plates (221), and is configured to drive the pair of front shaft plates (121) or the pair of rear shaft plates (221) to rotate around the front output shaft (112) or the rear output shaft (212).

4. The all-wheel drive self-propelled assembly of claim 3, wherein the height adjusting handle (32) and the transmission rod (31) are located on different sides of the front output shaft (112) or the rear output shaft (212).

5. The all-wheel drive self-propelled assembly of claim 3, wherein the height adjusting unit (30) further comprises a height-adjusting baffle (33) that cooperates with the height adjusting handle (32), and the height-adjusting baffle (33) is provided with a plurality of gear slots (331),
the height adjusting handle (32) is pivotally mounted on the pair of front shaft plates (121) or the pair of rear shaft plates (221), and is configured to rotate around the pair of front shaft plates (121) or the pair of rear shaft plates (221), and
after pushed along an axial direction of the front output shaft (112) or the rear output shaft (212) to be rotated, the height adjusting handle (32) is disengaged from the gear slots (331), and the height adjusting handle (32) is configured to be pushed to rotate around the front output shaft (112) or the rear output shaft (212), thereby driving the front-wheels (14) or the rear-wheels (24) to rotate around the front output shaft (112) or the rear output shaft (212) to adjust the distance between the front output shaft (112) or the rear output shaft (212) and the ground surface.

6. The all-wheel drive self-propelled assembly of claim 5, wherein the height adjusting unit (30) further comprises a handle reset elastic element (34) that cooperates with the height adjusting handle (32),
after pushed along the axial direction of the front output shaft (112) or the rear output shaft (212) to be rotated, the height adjusting handle (32) is disengaged from the gear slots (331), an elastic deformation of the handle reset elastic element (34) occurs, and
when the height adjusting handle (32) is released, the height adjustment handle (32) enters the gear slots (331) under the action of the handle reset elastic element (34).

7. The all-wheel drive self-propelled assembly of claim 1, wherein when the pair of front shaft plates (121) and the pair of rear shaft plates (221) are rotated by the height adjusting unit (30), the pair of front shaft plates (121) and the pair of rear shaft plates (221) are arranged to rotate along a same direction.

8. The all-wheel drive self-propelled assembly of claim 1, wherein the front-drive unit (10) further comprises a front-drive gear set (13), and the front-drive gear set (13) comprises:
a front-drive gear (131) that is fixedly mounted on the front output shaft (112), and
a front-driven gear (132) that is fixedly mounted on one of the front-wheels (14) and engaged with the front-drive gear (131); and
the rear-drive unit (20) further comprises a rear-drive gear set (23), and the rear-drive gear set (23) comprises:
a rear-drive gear (231) that is fixedly mounted on the rear output shaft (212), and
a rear-driven gear (232) that is fixedly mounted on one of the rear-wheels (24) and engaged with the rear-drive gear (231).

9. A mower (200), comprising:
an all-wheel drive self-propelled assembly (100) including:
a front-drive unit (10), comprising:
a front transmission mechanism (11) having a front motor (113), a front-wheel shaft mechanism (12), and front-wheels (14),
wherein the front-wheel shaft mechanism (12) comprises a pair of front shaft plates (121) and a front linkage rod (122) that connects the pair of front shaft plates (121), and
the front transmission mechanism (11) and the front-wheels (14) are mounted on the pair of front shaft plates (121);
a rear-drive unit (20), comprising:
a rear transmission mechanism (21) having a rear motor (213), a rear-wheel shaft mechanism (22), and rear-wheels (24),
wherein the rear-wheel shaft mechanism (22) comprises a pair of rear shaft plates (221) and a rear linkage rod (222) that connects the pair of rear shaft plates (221), and
the rear transmission mechanism (21) and the rear-wheels (24) are mounted on the pair of rear shaft plates (221); and
a height adjusting unit (30), which directly or indirectly controls the pair of front shaft plates (121) and the pair of rear shaft plates (221); to rotate to adjust a distance from the front transmission mechanism (11) and the rear transmission mechanism (21) to the ground surface, wherein the front linkage rod (122) is rotatably disposed above a plane where axes of the front transmission mechanism (11) and the rear transmission mechanism (21) are located;

a housing (201), disposed on the all-wheel drive self-propelled assembly (100), wherein the front linkage rod (122) is provided with a front avoidance groove (1221) that cooperates with the front transmission mechanism (11), the front transmission mechanism (11) is provided with a front output shaft (112), and the pair of front shaft plates (121) are pivotally mounted on the front output shaft (112);

the rear transmission mechanism (21) is provided with a rear output shaft (212), and the pair of rear shaft plates (221) are pivotally mounted on the rear output shaft (212); and when the distance between the front output shaft (112) and the ground is minimum, the front avoidance groove (1221) is disposed above a plane where the front output shaft (112) and the rear output shaft (212) are located.

10. The mower of claim 9, wherein the front linkage rod (122) is arranged that, when the front linkage rod (122) rotates, a movement trail of the front avoidance groove (1221) is located above the plane where the front output shaft (112) and the rear output shaft (212) are located.

11. The mower of claim 9, wherein the height adjusting unit (30) comprises a transmission rod (31), wherein one end of the transmission rod (31) is pivotally mounted on the pair of front shaft plates (121), and the other end of the transmission rod (31) is pivotally mounted the pair of rear shaft plates (221), and a height adjusting handle (32), wherein the height adjusting handle (32) is mounted on the pair of front shaft plates (121) or the pair of rear shaft plates (221), and is configured to drive the pair of front shaft plates (121) or the pair of rear shaft plates (221) to rotate around the front output shaft (112) or the rear output shaft (212).

12. The mower of claim 11, wherein the height adjusting unit (30) further comprises a height-adjusting baffle (33) that cooperates with the height adjusting handle (32), wherein the height-adjusting baffle (33) is provided with a plurality of gear slots (331), and the height adjusting handle (32) is pivotally mounted on the pair of front shaft plates (121) or the pair of rear shaft plates (221), and is configured to rotate around the pair of front shaft plates (121) or the pair of rear shaft plates (221); and after pushed along an axial direction of the front output shaft (112) or the rear output shaft (212) to be rotated, the height adjusting handle (32) is disengaged from the gear slots (331), and the height adjustment handle (32) can be pushed to rotate around the front output shaft (112) or the rear output shaft (212), thereby driving the front-wheels (14) or the rear-wheels (24) to rotate around the front output shaft (112) or the rear output shaft (212) to adjust the distance between the front output shaft (112) or the rear output shaft (212) and the ground surface.

13. The mower of claim 12, wherein the height adjusting unit (30) further comprises a handle reset elastic element (34) that cooperates with the height adjusting handle (32);

after pushed along the axial direction of the front output shaft or the rear output shaft to be rotated, the height adjusting handle (32) is disengaged from the gear slots (331), an elastic deformation of the handle reset elastic element (34) occurs; and when the height adjusting handle (32) is released, the height adjustment handle (32) enters the gear slots (331) under the action of the handle reset elastic element (34).

14. The mower of claim 11, wherein the height adjusting unit (30) further comprises a gear reset elastic element (35);

one end of the gear reset elastic element (35) is fixedly mounted on the transmission rod (31), and the other end of the gear reset elastic element (35) is fixedly mounted on the housing (201); and when the distance between the front output shaft (112) and the ground surface is adjusted from small to large by the height adjusting unit (30), an elastic deformation of the gear reset elastic element (35) occurs.

15. The mower of claim 9, wherein the front-drive unit (10) further comprises a front-drive gear set (13), and the front-drive gear set (13) comprises:

a front-drive gear (131) that is fixedly mounted on the front output shaft (112), and a front-driven gear (132) that is fixedly mounted on one of the front-wheels (14) and engaged with the front-drive gear (131); and the rear-drive unit (20) further comprises a rear-drive gear set (23), and the rear-drive gear set (23) comprises:

a rear-drive gear (231) that is fixedly mounted on the rear output shaft (212), and a rear-driven gear (232) that is fixedly mounted on one of the rear-wheels (24) and engaged with the rear-drive gear (231).

16. The mower of claim 9, wherein both the front transmission mechanism (11) and the rear transmission mechanism (21) comprise a gearbox (111, 211) and the front motor (113) and the rear motor (213) each respectively supply power to the gearboxes (111,211).

17. The mower of claim 9, wherein when the pair of front shaft plates (121) and the pair of rear shaft plates (221); are rotated by the height adjusting unit (30), the pair of front shaft plates (121) and the pair of rear shaft plates (221); are arranged to rotate along different directions.

* * * * *